United States Patent [19]

Geringer

[11] Patent Number: 5,325,055

[45] Date of Patent: Jun. 28, 1994

[54] RETAINED MAGNETIC STRIP FOR MOUNTING ON A ROTATING MEMBER TO PROVIDE A MAGNETIC FLUX TO BE SENSED

[75] Inventor: Kerry G. Geringer, Ames, Iowa

[73] Assignee: Sauer, Inc., Ames, Iowa

[21] Appl. No.: 805,534

[22] Filed: Dec. 11, 1991

[51] Int. Cl.$^5$ .................... G01P 3/487; H01F 7/02
[52] U.S. Cl. .................... 324/173; 324/174; 324/207.22; 335/296
[58] Field of Search ............ 324/173, 174, 207.22, 324/207.25; 310/68 B, 156; 384/448, 275, 276; 335/296, 297, 302, 303

[56] References Cited

U.S. PATENT DOCUMENTS

| | | |
|---|---|---|
| 3,191,106 | 6/1965 | Baermann . |
| 3,513,912 | 8/1967 | Boop ................................. 166/65 |
| 3,747,080 | 7/1973 | Taylor . |
| 4,107,601 | 8/1978 | Barmeier, Jr. et al. ............ 324/173 |
| 4,319,188 | 3/1982 | Ito et al. ............................. 324/173 |
| 4,795,278 | 1/1989 | Hayashi ......................... 324/174 X |
| 4,922,197 | 5/1990 | Juds et al. ..................... 324/207.21 |

FOREIGN PATENT DOCUMENTS

| | | |
|---|---|---|
| 0213732 | 3/1987 | European Pat. Off. ............ 324/174 |
| 3732958 | 4/1989 | Fed. Rep. of Germany ........................ 324/207.22 |
| 0218627 | 12/1983 | Japan ............................. 324/207.22 |

*Primary Examiner*—Gerard R. Strecker
*Attorney, Agent, or Firm*—Zarley, McKee, Thomte, Voorhees, & Sease

[57] ABSTRACT

The retained magnetic strip has an elongated strip of magnetic material formed into a nearly circular band with an attaching, retaining, and protective ring of substantially rigid and non-magnetic material which encloses the magnetic strip.

7 Claims, 1 Drawing Sheet

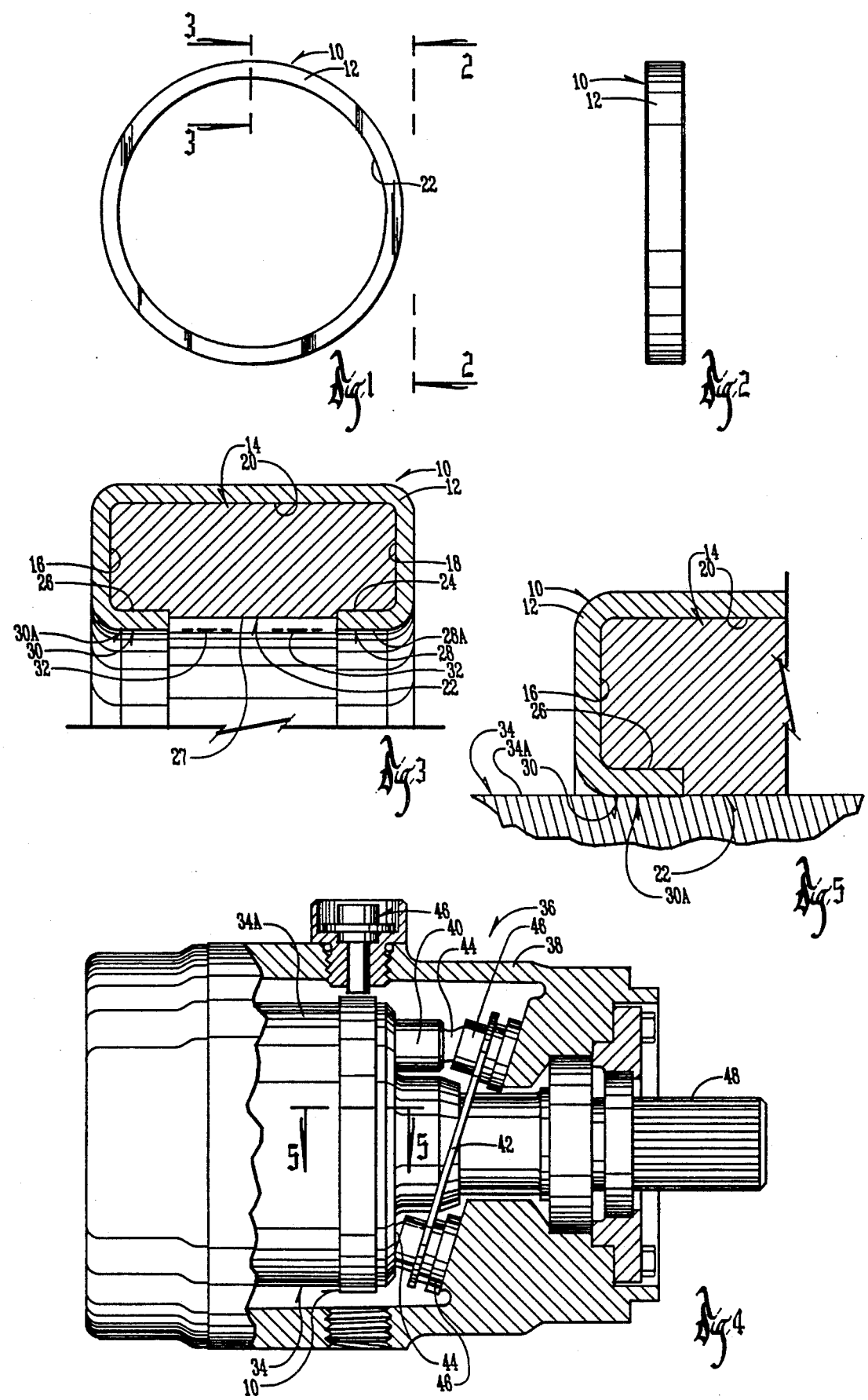

RETAINED MAGNETIC STRIP FOR MOUNTING ON A ROTATING MEMBER TO PROVIDE A MAGNETIC FLUX TO BE SENSED

BACKGROUND INVENTION

It is often desirable to have the ability to measure system variables, such as the speed of rotating elements. Many methods to measure speed are well known and many components are commercially available. One method of speed measurement is to generate an electrical signal by attaching magnets to the rotating element. A stationary pickup device, with lead wires attached to it, converts the changing magnetic flux levels into an electrical output (analog or digital) which is proportional to speed.

Some operating conditions faced by the rotating element whose speed is desired may be hostile to the attached magnetic material. For instance, in hydraulic applications, unprotected magnetic material could be subjected to high inertial forces while in an oil bath with extreme temperature variations ($-40°$ F. to $220°$ F.), erosion from various metallic and non-metallic particles, and cavitation from entrapped air.

While magnetic speed sensing devices of various types have existed for many years, problems persist relative to the attaching of sensor magnets to the rotating element. The magnetic material attached to the rotating element is usually flexible, but is fragile, has poor mechanical properties, and cannot withstand high inertial forces. If the magnetic material is attached to the rotating element merely by adhesives, harsh operating conditions may cause the magnetic material to come loose. Although a better adhesive may prevent loosening, it may also seriously impair later removal of the magnetic material. Existing speed sensing devices are difficult and time consuming to attach and remove from the rotating element. Sometimes little clearance exists between the rotating element whose speed is desired and other stationary or moving parts around it. Although some existing devices mount directly on the rotating element, they fail to maintain a low profile while securely attaching the magnetic material and protecting it from the environment.

Therefore, it is the principal object of this invention to provide a retained magnetic strip which is fully encased within a protective ring when placed on a shaft for sensing of rotational speed.

A further object of the present invention is to provide a magnetic strip which can be frictionally pressed into a protective element as a sensing ring to measure the rotational speed of said element.

A further object of the present invention is to provide a retained magnetic strip which is easily and securely installed onto the shaft or like to be measured for rotational speed.

A further object of the present invention is to provide a retained magnetic strip which is durably protected from the abrasive effects of the operating environment around the rotating element.

A further object of the present invention is to provide a retained magnetic strip which can be pressed off of the rotating element for replacement purposes.

A further object of the present invention is to provide a retained magnetic strip which maintains a low profile above the rotating element to which it is attached.

A further object of the present invention is to provide a retained magnetic strip which is capable of withstanding high inertial forces.

A further object of the present invention is to provide a retained magnetic strip which is economical to manufacture.

These and other objects will be apparent to those skilled in the art.

SUMMARY OF THE INVENTION

The retained magnetic strip of this invention comprises an elongated strip of magnetic material formed into a nearly circular band with an attaching, retaining, and protective cover or ring of substantially rigid and non-magnetic material which encloses the magnetic strip. Alternately, the magnetic strip may be frictionally press fitted into an already formed U-shaped retainer made of non-magnetic material. The retained magnetic strip means is sized to frictionally press fit on a rotating element whose speed is to be determined. After the desired speed measurements are obtained, the retained magnetic strip may be removed from the rotating element in a similar fashion.

BRIEF DESCRIPTION OF THE DRAWINGS

FIG. 1 is a side elevational view of the retained magnetic strip of this invention;

FIG. 2 is an elevational view of the retained magnetic strip of this invention taken on line 2—2 of FIG. 1; and FIG. 3 is an enlarged scale sectional view of the retained magnetic strip of this invention taken on line 3—3 of FIG. 1;

FIG. 4 is a partial sectional view taken through a fixed hydraulic displacement motor showing the device of this invention permanently installed therein; and FIG. 5 is an enlarged scale sectional view taken on line 5—5 of FIG. 4.

DESCRIPTION OF THE PREFERRED EMBODIMENT

The retained magnetic strip 10 is comprised of a non-magnetic stainless steel protective ring 12 and a strip of magnetic material 14 which are best shown in FIG. 3.

As shown in FIG. 3, the strip of magnetic material 14 has a rectangular cross-section with opposite sides 16 and 18, an outside diameter surface 20, an inside diameter surface 22 with side edges 24 and 26, and center portion 27.

The non-magnetic ring 12 covers the strip of magnetic material 14 completely on all sides and surfaces except for inside diameter surface 22. Flanges 28 and 30 on the ring 12 engage the side edges 24 and 26 of surface 22. Each flange extends some distance toward the center of the inside diameter surface 22 of the magnetic strip 14, but center portion 27 thereof remains exposed.

Strip 14 is preferably frictionally and compressingly held within ring 12. The material of strip 14 is normally expanded at center portion 27 until it extends to within plus or minus 0.005 inches of the inner plane of ring 12 designated by the numeral 32 in FIG. 3.

By orienting the flanges 28 and 30 on the enclosing means so as to be at the outside diameter surface 20 of the strip 14, a retained strip could be applied to the inside diameter of a rotating element or drum.

Magnetic strip 14 can be comprised of a flexible material known as 3M Plastiform magnetic strip B-1039 and can be magnetized to provide a flux pattern to be sensed, as is well known in the art. Ring 12 can be comprised of non-magnetic stainless steel 302/304 having a thickness of 0.010–0.015 inches. With reference to FIG. 3, the lateral width of ring 12 can be in the order of 0.4 of an inch; a typical diameter is in the order of 4.0 inches; and the lateral width of flanges 26 and 28 is in the order of 0.055 inches.

FIG. 4 shows retained strip 10 permanently mounted (except for replacement purposes) on a cylinder block 34 of a fixed hydraulic displacement motor 36 of the type shown in FIG. 3 of U.S. Pat. No. 4,953,426, the details thereof being incorporated herein by reference. The term "motor" as used herein will be synonymous with the term pump, whether fixed or variable, since the motor 36 can be used as either a motor or a pump. Motor 36 includes housing 38.

Mounted in housing 38 is rotatable cylinder block 34 which has a plurality of movable pistons 40 which are spring-urged towards swashplate 42. Each piston has an outwardly extending ball 44 which is rotatably received in coupler 46. The block 34 drives the output shaft 48.

Retained strip 10 is forcibly and frictionally mounted on the outside of block 34 which rotates within housing 38. The tight fit between retained strip 10 and the outer surface 34A of cylinder block 34 is shown in FIG. 5 with the center portion 27 of magnetic strip 14 in intimate contact with surface 34A, as are the inner plane surfaces 28A and 30A of flanges 28 and 30, respectively. FIG. 5 shows the final position of the installed retained strip 10 regardless of whether the free state of retained strip 10 has the center portion 27 inwardly or outwardly of plane 32. The frictional relationship between retained strip 10 and cylinder block 34 should be such to achieve the structural relationships shown in FIG. 5.

A conventional digital Hall effect speed sensor 46 is mounted in housing 38 directly above retained ring 10 (FIG. 4) and is connected to a suitable electronics control unit so that the speed of rotation of cylinder block 34 can be measured and coordinated with other operational aspects of the apparatus that also may be measured. When the block 34 and retained ring 10 rotate, a changing pattern of magnetic flux results. This is picked up by sensor 46 and is converted by usual means into an electrical output signal which is proportioned to rotational speed.

While the retained ring is rotating within a hostile environment of the hydraulic fluid or the like, magnetic strip 14 is completely encased and protected from any adverse effects of that environment.

Thus, it is seen that this invention will achieve at least its stated objectives.

What is claimed is:

1. A retained magnetic strip means for mounting on a rotating member to provide a pattern of magnetic flux to be sensed by a speed sensor means, comprising,
   an elongated strip of magnetic material being magnetized to provide a flux pattern to be sensed, said strip having a circular shape and having opposite sides, and inner and outer surfaces;
   a continuous ring means of substantially rigid and non-magnetic material extending around the sides and covering only one of said inner or outer surfaces, and opposite continuous flange means engaging only a portion of said inner or outer surfaces that is not covered by said ring means.

2. The strip means of claim 1 wherein said ring means covers the outer surface of said strip of magnetic material.

3. The strip means of claim 1 wherein said ring means is U-shaped in cross section with side portions that engage the sides of said strip of magnetic material, and flange means on said side portions that overlay at least a portion of one of said inner or outer surfaces of said strip of magnetic material.

4. The strip means of claim 3 wherein said flanges engage the inner surface of said strip.

5. The strip means of claim 1 wherein an exposed center portion surface of said strip of magnetic material exists between said flange means, said center portion surface dwelling in substantially the same plane occupied by said flange means, so that when said strip means si forcibly and frictionally mounted on a rotatable member having an outer surface, said flange means and said center portion surface will be in a tight intimate sealed contact with said outer surface of said rotatable member.

6. The strip means of claim 5 wherein said rotatable member is a rotatable cylinder block of a hydraulic displacement motor rotatably mounted within a pump housing, said cylinder block having an outer surface, said strip means frictionally mounted on the outer surface of said cylinder block so that said flange means and said center portion surface will be in tight intimate sealed contact with said outer surface of said rotatable member; and a magnetic flux sensor means is mounted in said housing adjacent said strip means.

7. The strip means of claim 5 wherein said rotatable member is a rotating member within a closed housing of a power transfer means, said rotating member having an outer surface, said strip means frictionally mounted on the outer surface of said rotating member so that said flange means and said center portion surface will be in tight intimate sealed contact with said outer surface of said rotatable member; and a magnetic flux sensor means is mounted in said housing adjacent said strip means.

* * * * *